(12) United States Patent  (10) Patent No.: US 8,589,297 B2
Enzaldo  (45) Date of Patent: *Nov. 19, 2013

(54) PREPAID VALUE ACCOUNT WITH REVERSION TO PURCHASER SYSTEMS AND METHODS

(75) Inventor: Robert Enzaldo, Littleton, CO (US)

(73) Assignee: The Western Union Company, Englewood, CO (US)

( * ) Notice: Subject to any disclaimer, the term of this patent is extended or adjusted under 35 U.S.C. 154(b) by 27 days.

This patent is subject to a terminal disclaimer.

(21) Appl. No.: 13/300,278

(22) Filed: Nov. 18, 2011

(65) Prior Publication Data

US 2012/0123936 A1  May 17, 2012

Related U.S. Application Data

(63) Continuation of application No. 12/500,345, filed on Jul. 9, 2009, now Pat. No. 8,082,195.

(51) Int. Cl.
*G06Q 40/00* (2012.01)

(52) U.S. Cl.
USPC ........... 705/41; 705/30; 705/35; 705/39; 235/379; 379/114.2

(58) Field of Classification Search
USPC ......... 705/41, 30, 35, 39; 235/379; 379/114.2
See application file for complete search history.

(56) References Cited

U.S. PATENT DOCUMENTS

8,082,195 B2  12/2011  Enzaldo

*Primary Examiner* — Vanel Frenel
(74) *Attorney, Agent, or Firm* — Kilpatrick Townsend & Stockton LLP (57) ABSTRACT

Systems, methods, and devices are described for a refundable prepaid transaction cards. The methods and systems include a prepaid transaction card funded with funds by a purchaser. Also included is an issuer. The issuer receives the funds a distributes a prepaid transaction card associated with the funds. The methods and systems also include a prepaid transaction card identifier, wherein the prepaid transaction card identifier identifies the prepaid transaction card. The issuer maintains a central computer system that stores at least one parameter entitling the purchaser to a refund of at least a portion of the funds. The methods and systems also include a cash pool, the cash pool holding at least a portion of the funds funded by the purchaser.

20 Claims, 8 Drawing Sheets

PREPAID VALUE ACCOUNT WITH REVERSION TO PURCHASER SYSTEMS AND METHODS

CROSS-REFERENCES

This application is a continuation of U.S. patent application Ser. No. 12/500,345, filed Jul. 9, 2009, entitled "PREPAID VALUE ACCOUNT WITH REVERSION TO PURCHASER SYSTEMS AND METHODS," which is hereby incorporated by reference in its entirety for all purposes.

BACKGROUND OF THE INVENTION

Embodiments of the present invention relate in general to the use of stored value cards. In particular, embodiments of the present invention relate to refundable stored value cards, with the option for withdrawal of cash at an agent location and the setting of restrictions on the stored value card by the purchaser. In many instances, this involves the setting of a velocity limit on transactions.

In many instances, a person may wish to give to another or keep for herself a stored value card. Such a stored value card may serve many uses: it may function as a gift towards purchases at a particular merchant or a group of merchants, it may serve as an emergency source of funds, or it may be a way of providing an allocated amount of spending to another, such as a parent providing a child with an allowance, or a son sending his family in another country money to subsist on.

A stored value card is typically offered by a merchant, a bank, or a credit card company. The stored value card typically may be used in similar manner to cash at the locations that accept the stored value card. If the stored value card is associated with a credit card company such as VISA or AMERICAN EXPRESS, it may be accepted anywhere credit cards offered by these companies are accepted.

While stored value cards present advantages, a common drawback is that, once an amount of money has been added to a card, the amount is not nonrefundable. Consider the following example, if a father wishes to provide his son with a $50 stored value card to a shoe store, he may provide the shoe store with $50 and receive a stored value card for the same amount in exchange. The father may then give the stored value card to his son with instructions to purchase appropriate footwear for the coming Spring. The son, with the stored value card, may purchase a pair of baseball cleats for $39. After the purchase, the stored value card would have $11 remaining If neither the son nor the father wishes to use the remaining $11 at the shoe store, it may remain unused for a long period of time, possibly never being used. Excluding an additional purchase at the shoe store, the funds on the stored value card may be useless to the father and son. This remaining money may remain with the merchant or it may escheat to the state. The merchant may charge the account with a maintenance fee on a recurring basis, eventually resulting in a balance of zero dollars on the account associated with the stored value account.

In another possible situation, a first person may wish to use a stored value card to issue another person (or himself) a recurring sum of money, such as an allowance for recreation or to help with living expenses. The first person may wish to limit the types of items or services the second person, who possesses the stored value card, may purchase. The first person may wish to limit the second person's rate of spending, the number of transactions, the locations of transactions, or many other variables. Currently, the purchaser may not be able to place such limits or restrictions on the use of a stored value card. Rather, the second person may use the funds as she sees fit.

Further, if a person wishes to issue funds to another person on a recurring basis, she may be faced with the prospect of repeatedly purchasing a stored value card and sending it to the desired recipient. Such a process may take time, waste resources, and cost money to send via mail. These drawbacks may be especially pronounced if the two persons are located in different countries. Further, although the person may wish to provide another with recurring funds for purchases, she may also wish to be able to restrict the items or services that may be purchased with the funds. Repeatedly sending the recipient a stored value card may not allow for control over the goods or services purchased, especially in an international context.

Another restraint may be encountered by a person wishing to purchase a store value card for another: the stored value card may only be usable for goods and services. A person may wish to send another person a stored value card that may be used for both cash withdrawals and for making purchases of goods and services. The invention described herein serves to remedy these and other problems.

BRIEF SUMMARY OF THE INVENTION

In some embodiments, a refundable prepaid transaction card system is present. The system includes a prepaid transaction card. This prepaid transaction card may be funded with funds by a purchaser. The system may include an issuer. The issuer may be the distributor of the prepaid transaction cards. The system may also include a prepaid transaction card identifier. The prepaid transaction card identifier might identify the prepaid transaction, and is provided to the purchaser. This transaction card identifier may allow the purchaser to obtain at least a portion of unused funds associated with the prepaid transaction card when a parameter is triggered. The system further may include a central computer system. The central computer system may be maintained by the issuer and stores parameters set by the purchaser as to how the prepaid transaction card may be used. Finally, the system may include a cash pool. The cash pool may include at least a portion of the funds funded by the purchaser to the prepaid transaction card. The cash pool may also include funds funded by the purchaser and a record of a plurality of purchasers and funds funded by the plurality of purchasers is stored at the central computer system.

In some embodiments, the parameters set by the purchaser may include a time limit, after which the prepaid transaction card is inactivated. Other parameters may include a velocity limitation or a frequency limitation. In some embodiments, a refund of funds may be distributed to the purchaser upon at least one of the parameters being satisfied. In some embodiments, the purchaser may receive the refund in cash at an issuer agent location.

In some embodiments, a method for completing financial transactions with a refundable prepaid transaction card is present. The method may include receiving funds from a transaction card purchaser. A transaction card may then be dispensed to a user. A transaction card receipt may be dispensed to the purchaser. This receipt may identify the transaction card. A set of rules for the transaction card may be received from the transaction card purchaser. A record of the funds received from the purchaser into a cash pool may be stored. A determination might be made that at least one rule has been satisfied. Finally, at least a partial refund of funds from the cash pool for funds associated with the transaction card that were not spent by the user may be made.

In some embodiments, this method may further include receiving a debit request associated with the transaction card from a merchant. A determination may then be made of whether the debit request is in accordance with at least one rule set by the user. Finally, an approval may be transmitted to the merchant.

In some embodiments, a notification of the debit request may be sent to the purchaser. In some embodiments, the refund is issued to a third party, such as a charity.

In some embodiments, a method for authorizing a transaction linked to an account may be present. The method includes receiving account information from a funder to link with a transaction card. A set of rules may be received at least partially governing the use of the transaction card. A determination may be made that an approval request complies with the set of rules at least partially governing the use of the transaction card. A request for funds from the account of the funder may be made. In some embodiments, the method includes request approval from the funder via a communication to a mobile device. A period of time then may be waited for a response. A response may then be sent to the merchant.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Devices, systems, and methods are described for the implementation of a novel form of stored value cards. These stored value cards allow for greater flexibility for a purchaser and user. The purchaser may place limits or rules on the purchases made by the recipient. Further, the purchaser may be able to get a refund on unused funds associated with the stored value card. The purchaser may also be able to allow for direct debit of funds from her account by a third party possessing a transaction card.

This description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add, various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

Stored value cards, often appearing in the form of gift cards to a particular merchant or group of merchants, are seen by some people as a popular and convenient way of giving a present. Such stored value cards may serve a multitude of other purposes. For example, a stored value card may be used to provide an allowance to a child or friend, or may be a convenient way to send funds to a person in another country. Alternatively, a stored value card may be used by a person in place of a credit card if the person wishes to prepay for transactions.

Increased flexibility in how a stored value card functions would benefit the purchaser of the stored value card, the issuer of the stored value card, and the user of the stored value card. The purchaser may wish to give a person an amount of money to spend at a particular merchant or group of merchants, but receive a refund for the unused portion of the money after a period of time. A refundable stored value card may allow a purchaser to make such an arrangement. Further, a purchaser may wish to set particular restrictions on the use of the stored value card, such as how much money may be spent from it in a given week and at which merchants. Allowing the purchaser to set certain limits or rules associated with the stored value card may allow such an arrangement.

Figure 1:
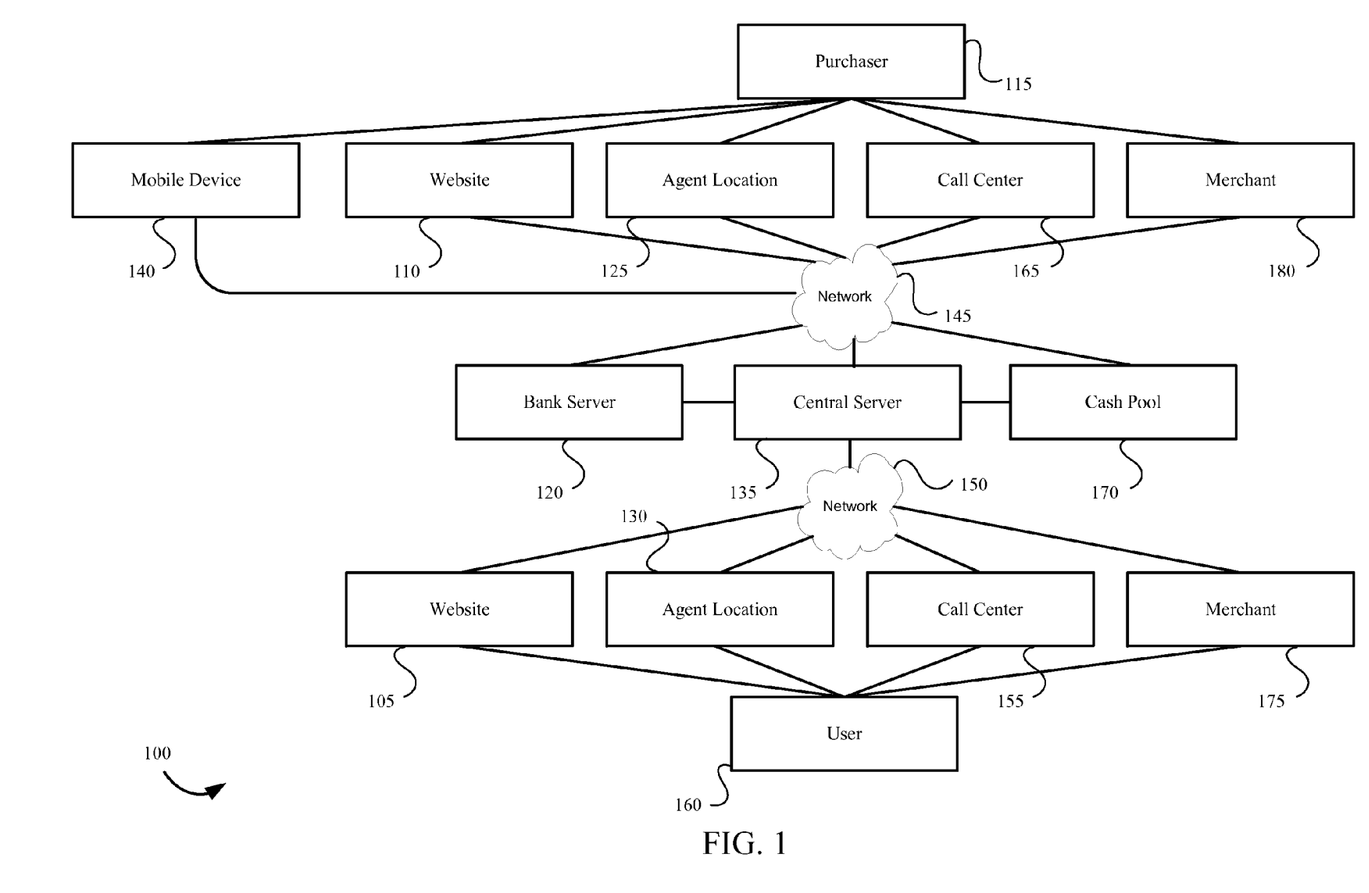
FIG. 1 illustrates an embodiment of a system using a stored value card.

FIG. 1 illustrates a possible embodiment of a system 100 using a configurable stored value card. In this embodiment, a purchaser 115 interacts with one of a number of possible entities from which he can purchase a stored value card. The purchaser may purchase the stored value card from a website 110, an agent location 125, a call center 165, a mobile device, or a merchant 180. If the purchaser purchases the stored value card on a website 110, the stored value card may be shipped to the purchaser 115 or may be mailed directly to a recipient chosen by the purchaser 115. In some embodiments, no physical stored value card is provided to the purchaser; instead a transaction number is provided to the purchaser 115. This number may be used by the purchaser in a similar manner as a store value card. For example, the transaction number may be used for making purchases via the Internet. The purchaser 115 may be provided with the transaction number or it may be provided to another user 160 directly.

If a purchaser purchases a stored value card via an agent location, he may be provided with the stored value card immediately. The agent location 125 may represent a network of merchants who can communicate with a central server system 135. These agent locations may have the ability to receive payment in multiple forms. These forms may include cash, check, credit, and debit.

Another option that may be present for a purchaser 115 is a call center 165. The call center 165 may receive or call potential purchasers regarding the purchase of a stored value card. The purchaser 115 would inform an employee at the call center 165 of the amount of money he wishes to have associated with the stored value card. Other information he may be required to provide would be the method of payment, which may include instructions to pay at the nearest agent location 125, details about the user 160, and other payment details.

A fourth possible option for a purchaser 115 is the purchase of a stored value card from a merchant 180. A merchant 180 may be a store or vendor that sells a multitude of different products and/or services. The merchant 180 may have a display with stored value cards representing a variety of different entities. The stored value cards sold by the merchant 180 may have a predetermined value associated with the stored value card. For example, a merchant may display a stored value card 180 that has $20 printed on its face. The purchaser 115 would be required to pay $20 to purchase this stored value card from the merchant 180.

A fifth possible option for a purchaser 115 may be the purchase of the stored value card via a mobile device 140. A purchase via a mobile device may proceed similar to a purchase via a website 110. The user may be provided with a transaction number directly at her mobile device 140, or may have a stored value card shipped to her.

With each of these ways of purchasing a stored value card (including via a website 110, an agent location 125, a call center 165, a merchant 180 and a mobile device 140), the purchaser 115 may present certain restrictions for the use of the stored value card. Depending on the mode of purchase, the purchaser 115 may be asked similar questions, but in a different form. For example, if the purchaser purchases the stored value card via a call center 165, questions regarding restrictions to be placed on the card may be asked orally. If the purchaser 115 purchases the stored value card on a website 110, the questions may appear as text on a computer being used by the purchaser 115.

There are many possible restrictions that may be placed on the stored value card by the purchaser. For example, a purchaser could impose a velocity limit. A velocity limit may restrict the number of transactions in a given amount of time, or the rate of transactions in a given amount of time. For example, despite there being $500 on a stored value card, the user 160 of the stored value card may be limited to a maximum of 5 transactions using the stored value card. If each of these transactions by the user 160 were only for $1, $495 would be remaining on the stored value card. The stored value card, now deactivated from use because of the velocity limit, may cause a refund to be issued to the purchaser 115.

Besides a total number of transactions with the stored value card made by the user 160 being limited, the number of transactions in a certain time period may be limited. For example, in a given 24 hour period, a user 160 may only be permitted 2 transactions. Alternatively, the user 160 may be subjected to an amount limit. Such a velocity limit may be a preset amount of funds per day, such as $50. These limitations may be used alone or in combination: for example, the user may be subjected to a limit of $100 per week, up to 5 transactions. If either of these limits is exceeded, the stored value card may be disabled. If the user 160 attempts to use the stored value card, it may be denied.

Other forms of limitations may be applied by the purchaser 115 to the stored value card. A limit may be placed on the types of merchants where the user 160 may use the stored value card. For example, the purchaser may restrict the user 160 from using the stored value card for categories such as entertainment, but permit the use of the stored value card for categories such as food or fuel.

These and other limitations may be overridden. For example, the purchaser 115 may set up the stored value card to not block any transaction outright. Instead, the transaction may be permitted to proceed as normal; however a message may be sent to the purchaser 115, such as via a mobile device 140. Such a message may present the purchaser 115 with only information. This information may be "Bill Hogan has made a purchase of $75 on the stored value card at The Music Store on Apr. 27, 2009 at 3:27 pm." In some embodiments, these statements may constitute more than information and allow the user 160 to make a purchase outside of the limitations set by the purchaser 115. For example, the purchaser 115 may be presented with a question at his mobile device 140, such as: "Bill Hogan is attempting to make a purchase of $75 at the Music Store. Approve?" A response of "yes" would approve the transaction; a "no" would deny the transaction. Such a system could use SMS text messaging. If an approval or denial is not received from the purchaser in a predetermined amount of time, a default response may be sent to the merchant in response to the request for approval. This predetermined response may be set by the purchaser 115.

Each of the entities that the purchaser 115 may purchase a stored value card from, including mobile device 140, website 110, agent location 125, call center 165, and merchant 180, communicates with a central server 135. This communication may be through a network 145. The network may be a private network or a public network, such as the Internet. Various entities may use various combinations of networks. For example, a mobile device 140 may communicate over a private network, such as a cellular service provider's network, with information being further routed over the Internet to communicate with the central server 135.

The central server 135 may be a computer, server, or a group of servers or computers. These computers may be centrally located or distributed over a geographical area. The central server 135 may include a computer-readable storage medium, such as random access memory or a hard drive. The central server may maintain a database or other record of money the purchaser 115 has placed on a stored value card. This database may include information such as a transaction identifier associated with the stored value card, the purchaser's name, the user's name, the amount stored on the card, and information related to previous transactions including previous transaction dates, times, locations, and the merchants involved in the transaction.

When a purchaser 115 purchases a stored value card, the funds he uses to purchase the stored value card may be stored until used by the user 160. A cash pool 170 may be maintained. The cash pool 170 may be an account maintained at a bank of all the money deposited by various purchasers that has not been used. Funds may be added and subtracted from the cash pool by the central server 135 communicating with a bank server 120. Alternatively, the operator of the central server 135 may maintain all the funds separate from a bank. The cash pool 170 may consist of individual accounts for each stored value card, or may consist of one pool of money with a record maintained at the central server 135 of the funds associated with each stored value card.

The cash pool 170 represents one way an operator of such a stored value card system may profit from offering stored value cards that are refundable. If a large enough cash pool 170 is present, the interest gained from maintaining the account or accounts with the value for the stored value cards may be significant. It is likely that interest is not returned to the purchaser 115 or the user 160. Alternatively, as an inducement for purchasing the stored value card, the operator of the system 100 may add the earned interest to the value of the associated stored value card.

A user 160 may use the stored value card with the same or similar entities as where the purchaser may have purchased the stored value card. The user 160, who may be in physical possession of the stored value card, may have received the card from the purchaser 115, such as in person or via mail. Alternatively, the user 160 may have received the stored value card from the entity from which the purchaser 115 purchased the stored value card. In some instances, the user 160 may be the purchaser 115. Such an arrangement may be especially useful if the user/purchaser has difficultly maintaining a budget. Allowing such a person to set conditions on her own spending may help to force her to stay on budget.

The user 160 may use the stored value card for purchases at websites 105 and merchants 175. The user may also use the stored value card for withdrawal of cash from agent locations 130. The user may also interact with a call center 155 for information purposes. For example, the user may call the call center 155 operated by the provider of the system 100 for information regarding the restrictions or rules placed by the purchaser on the stored value card or the amount of funds remaining on the card. The user 160 may be able to make withdrawals from the call center 155. The cash may be provided in the form of a check mailed to the user 160, or the cash may be made available for pick-up at an agent location 130. The agent location 125 and the agent location 130 may be the same or different agent locations. The call center 165 and the call center 155 may be the same or different call centers. The merchant 180 and the merchant 175 may be the same or different merchants. Finally, the website 105 and the website 110 may be the same or different websites.

When the user 160 uses the stored value card, the entity it is used with may interact with the central server through a network 150. This network 150 may be the same or different network as network 145. As with network 145, network 150 may be a public or private network, or may be a combination of various networks functioning in concert to communicate between the entity and the central server 135. The central server 135 may then determine whether the request by the user 160 should be approved or denied based upon the amount of value associated with the stored value card and the rules set by the purchaser 115 for the stored value card.

If a transaction entered into with the stored value card by the user 160 requires approval by the purchaser 115, the request by an entity, such as 105, 130, 155, or 175, may be sent through the network 150 to the central server 135. The central server may then send the request through network 145 to a device of the purchaser 115, such as mobile device 140. A response from the purchaser 115 may then be transmitted via network 145 to the central server 135. The central server may then either approve or deny the request by the user 160 via network 150 to the originating entity.

Such a system 100 may allow for the purchaser 115 to receive a refund for the unused funds associated with the stored value card. The rules set by the purchaser 115 may specify a date after which the purchaser 115 is entitled to a refund of the unused portion of the funds associated with the stored value card. Alternatively, the purchaser 115 may be able to request all or some of the remaining funds associated with the stored value card back at any time. If the user 160 reaches some maximum amount of transactions, the stored value card may be deactivated with a refund issued to the purchaser 115. The refund may be automatic or it may be available upon request.

The refund issued from the cash pool 170 to the purchaser 115 may be returned via the method the stored value card was initially purchased with. For example, if the purchaser 115 initially purchased the stored value card at an agent location 125, the purchaser 115 may be able to return to the agent location 125 and receive the refund. The purchaser 115 may be required to present a receipt with an identifier sufficient to either identify the purchaser 115 or the stored value card associated with the refund to be issued.

In some embodiments, the purchaser 115 may obtain the refund via a different entity than the stored value card was purchased from. For example, if the purchaser 115 initially purchased the stored value card via a call center 165, the purchaser 115 may be able to receive the refund at an agent location 125 in cash.

Figure 2:
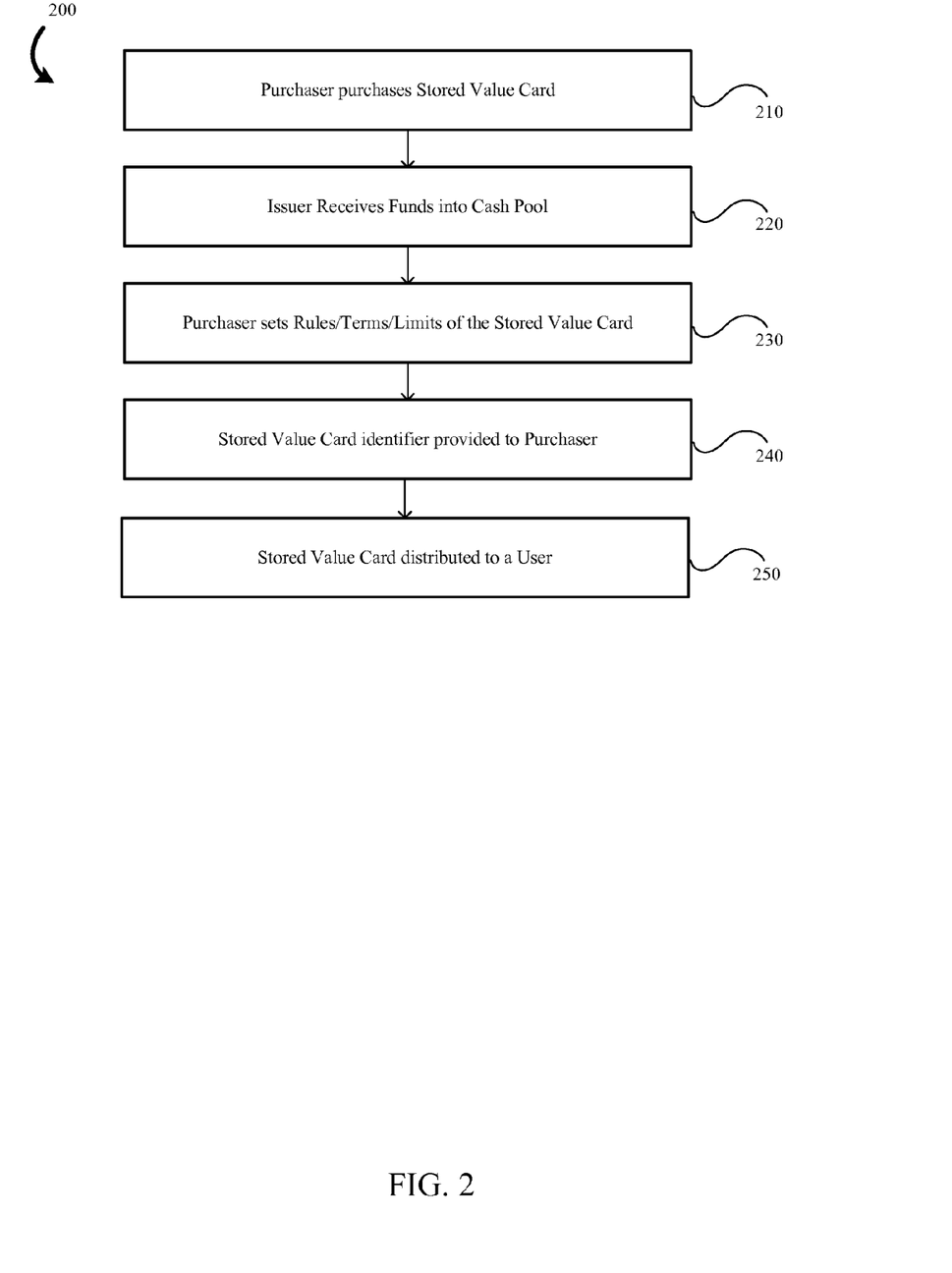
FIG. 2 illustrates an embodiment of a method for purchasing a stored value card.

The system 100 may be used to execute a large number of different methods involving stored value cards. These methods may include the following methods described herein. FIG. 2 illustrates a method 200 for purchasing a stored value card. A purchaser may purchase 210 a stored value card. Such a purchase may occur from an entity such as a merchant, call center, a website, or an agent. These entities may be the same entities as described in relation to FIG. 1, or may be different entities. The purchase 210 may include the purchaser transferring funds to the operator of the stored value card system (alternatively referred to as the "issuer"). These funds may be transferred in any form, such as with cash, credit, debit, check, or personal property.

In addition to an issuer, a retailer may have input on how a stored value card may be used. For instance, while an issuer may operate the stored value card system, the retailer may also set parameters governing how the stored value card may be used. As an example, think of a store branded gift card. While an issuer may be operating the stored value card system, the stored value card may be imprinted with the retailer's logo. The retailer may restrict use of the stored value card to only stores or websites operated by the retailer. Despite the restriction of only using the stored value card at the retailer, certain functions may be performed directly between the purchaser or user and the issuer.

Whichever form the funds are transferred in, the issuer may receive 220 the funds into a cash pool. This cash pool may be the cash pool described in reference to FIG. 1 or it may be some other cash pool. This cash pool may serve to store only funds associated with the purchaser or it may store funds for a plurality of purchasers.

The purchaser may then be asked to set 230 the parameters (alternatively referred to as the rules, terms, or limits) of the stored value card. The following are some exemplary rules, terms, limits, and conditions that a purchaser may be able to set for the stored value card: a time or date on which the stored value card expires or is suspended, a category of merchant at which the stored value card may be used, a limit to the amount spent per a time period, a limit to the number of transaction per a time period, an automatic refund date, whether to receive approval messages, whether to allow overrides (by either the purchaser or the user), whether to send the purchaser transaction information, whether to allow cash withdrawals, whether to allow deposits to the account from the user, and whether identity of the user must be verified. Those with skill in the art will recognize that other terms, limits, conditions, and rules may be placed on the stored value card by the user.

The purchaser may then be provided 240 with a stored value card identifier. This may be the same identifier stored on the stored value card, or it may be some other identifier that is associated with the stored value card. This identifier may be provided in the form of a receipt. It may be a number, a password, the purchaser's name, the purchaser's phone number, or any other identifier capable of identifying the stored value card purchased by the purchaser. This identifier may be used at a later time for the purchaser to obtain a refund for an unused portion of funds associated with the stored value card.

The stored value card may then be distributed 250 to the person who will be the user of the stored value card. This may involve the stored value card being given to the purchaser, with the purchaser later giving the stored value card to the user. Alternatively, the entity that the stored value card was purchased from may provide the stored value card directly to the purchaser.

Once the user has possession of the stored value card, an activation process may be necessary. Following activation, if necessary, the user may follow a method 300 illustrated in FIG. 3 for purchasing an item or good with the stored value card. Such a method may be completed using a system such as system 100 of FIG. 1. First, a user may present 310 the stored value card to a merchant. If the transaction is via the Internet, the user may present a number stored on the stored value card.

Figure 3:
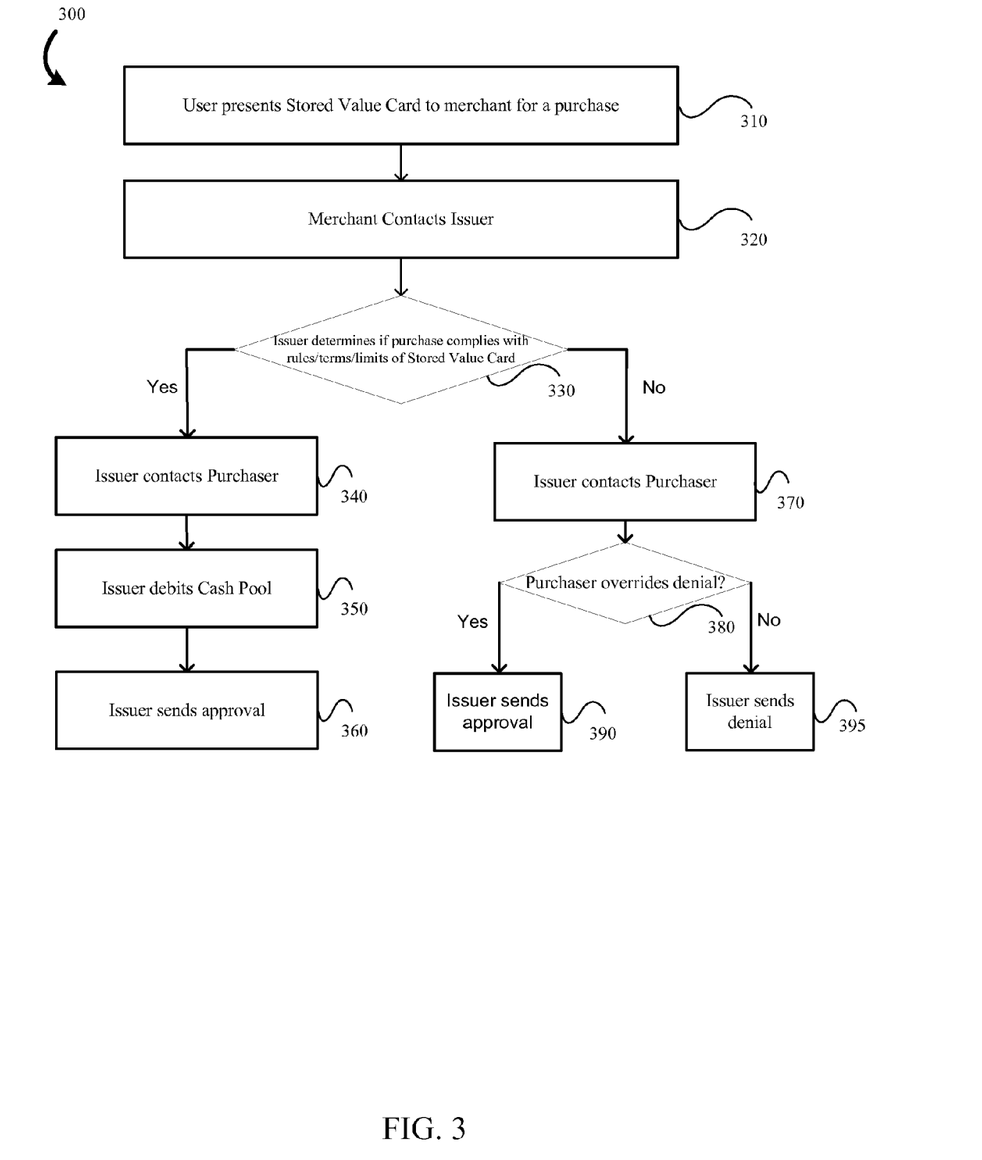
FIG. 3 illustrates an embodiment of a method for purchasing a service or goods with a stored value card.

The merchant may then contact 320 the issuer. This may involve sending a request for approval of the transaction. This may occur electronically, for example, from a point-of-sale device to a host computer system of the stored value card issuer. Alternatively, it may involve the merchant contacting the issuer via telephone or the Internet. In some embodiments, the merchant may be contacted via the same network used to settle credit card transactions or through an automated clearing house (ACH) transaction.

If the transaction occurs via a credit card settlement network, typically when a merchant requests a payment, the merchant contacts an acquirer. The acquirer is typically a bank. The acquirer verifies the account number attached to the transaction card, the transaction type, and the amount with the issuer. At a later time, often in the form of a batch transaction, the issuer will be debited for the transaction amount by the acquirer.

Following a request for approval being sent, the issuer determines 330 if the purchase complies with the parameters of the stored value card. This may include determining whether there are sufficient funds associated with the stored value card to complete payment for the requested transaction. The parameters of the stored value card may further comprise the parameters set by the purchaser. Further, some parameters may be set by a retailer associated with the stored value card.

If the issuer determines that the purchase complies with the rules, terms and limits of the stored value card, the purchaser may be contacted 340. This may be due to a parameter set by the purchaser. If the issuer has already determined that the purchase complies with the parameters of the stored value card, the information sent to the purchase may be for information purposes only. Such information may include the time, date, location, and amount of the transaction. Alternatively, the purchaser may receive no contact following a requested transaction, or the information may be provided on only a daily, weekly, or monthly basis.

The cash pool may then be debited 350 for the amount requested by the merchant. Alternatively, the cash pool may be debited 350 at some time in the future, or a hold is placed upon the funds necessary to complete the transaction. Next, the issuer sends 360 approval to the merchant. Again, this approval may be sent electronically, or it could be given verbally by a representative of the issuer. Upon receiving this approval, the purchase by the user may be complete.

Returning to step 330, if the issuer determines that the transaction does not comply with the parameters of the stored value account, the transaction may be denied. The transaction may be denied based on insufficient funds in the cash pool associated with the stored value card. Alternatively, the transaction may be denied based on the parameters set by the purchaser. Depending on the aspect of the transaction that does not comply with the parameters set by the purchaser, the purchaser may have the opportunity to override the denial of the transaction. In some embodiments, parameters are also set by the issuer. These parameters may or may not be able to be overridden.

The issuer may contact 370 the purchaser via any number of methods. This may include a text message asking whether the purchaser wishes to override the rejection and allow the transaction. Other possible ways the issuer may contact the purchaser include a phone call, or an email. This may be especially useful in emergency situations. For example, a purchaser may set a limit of $100 per day. However, the user may be injured and required to make a payment of $500 to a hospital before it will render services to the user. The purchaser may wish for such a transaction to be approved. With an override system, the purchaser may have the opportunity to allow such a transaction to be approved.

If the issuer contacts 370 the purchaser via text message, the text message may pose a "yes" or "no" question, such as "Do you want to approve a transaction for $270 requested by User at Vim's Tire Shop'?" The purchaser may then respond 380 "yes" to override the denial. If the purchaser responds "yes" within a predefined period of time, the issuer may send 390 an approval to the merchant requesting the transactions. If the purchaser responds "no," the issuer may deny 395 the request sent by the merchant. If no response is received from the purchaser within a predefined amount of time, the issuer may either approve or deny the request based on a default selection either defined by the issuer or the purchaser. A more detailed description of the approval process will be detailed in FIG. 6.

Following a parameter or rule of the stored value card being met, the purchaser may be entitled to a refund for unused funds associated with a stored value card. Such a refund may be issued by a method 400 of FIG. 4 performed with a system such as system 100 of FIG. 1. The issuer may then make a determination 420 whether the purchaser is entitled to a refund. In some instances, the funds that are remaining in the cash pool associated with the stored value card may be ceded to the stored value card system provider or may escheat to the state. Once an issuer determines 410 that a parameter has been met, the stored value card may be deactivated 430 and 480. The issuer may also contact 440 and 490 the purchaser. This may be to inform the purchaser that he is either entitled to a refund or not entitled to a refund.

Figure 4:
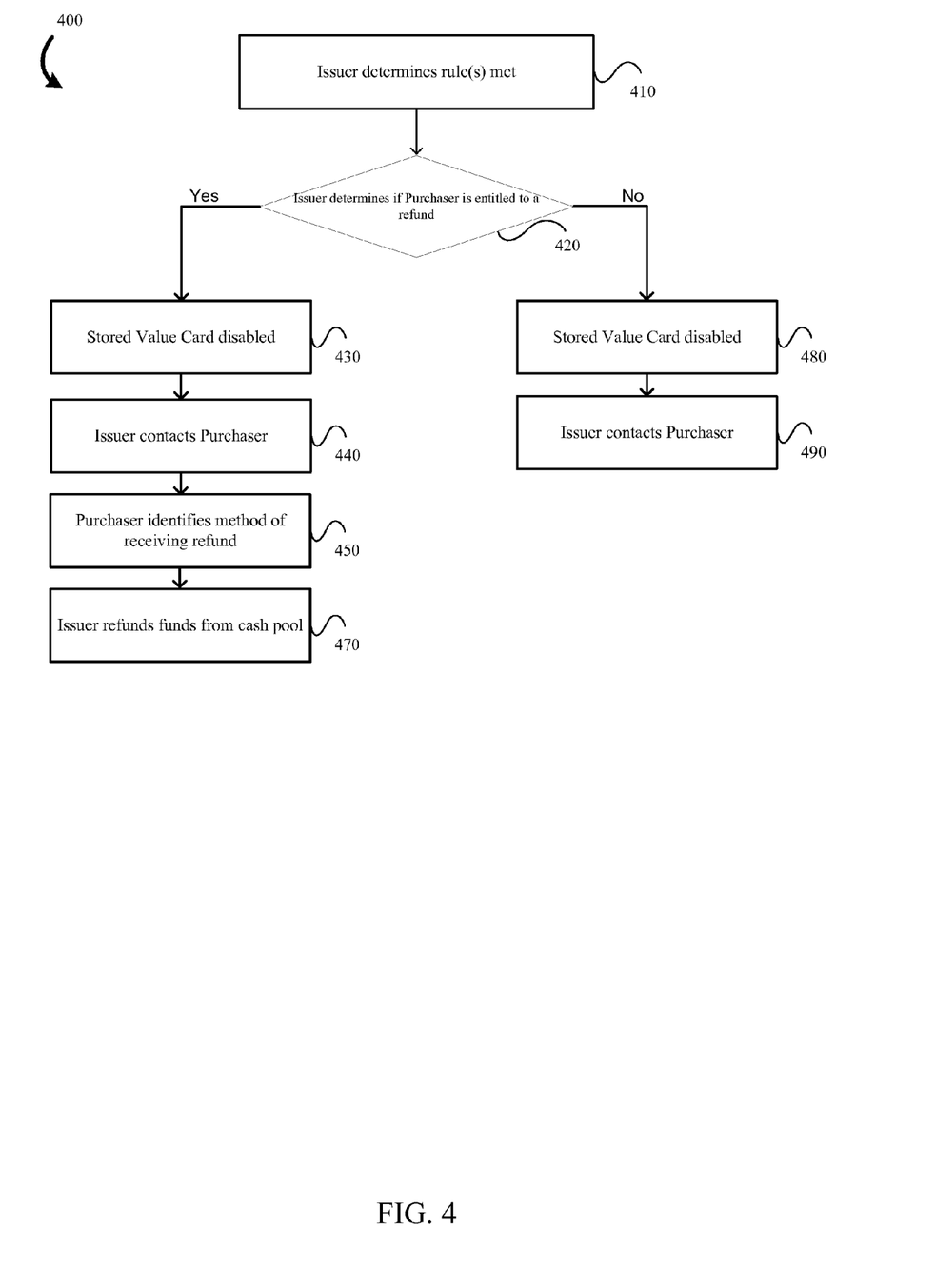
FIG. 4 illustrates an embodiment of a method for issuing a refund associated with a stored value card.

If the purchaser is entitled to a refund, the purchaser may have the opportunity to identify 450 a preferred method of receiving the refund. This may include cash, a check, a refund to his credit card, or any other method of payment. The purchaser may specify his preferred method of refund at the time of purchasing the stored value card. In some embodiments, when the issuer contacts 440 the purchaser, the issuer inquires as to the method of refund desired by the purchaser.

The issuer may then refund 470 all or a portion of the funds associated with the stored value card to the purchaser. If the purchaser desires a refund in the form of a check, or a deposit to an account, the refund may be issued remotely. The refund may be issued by the issuer, or may be issued by an associated retailer. However, if the refund is requested in cash, additional steps may be required for the purchaser to receive his refund.

Figure 5:
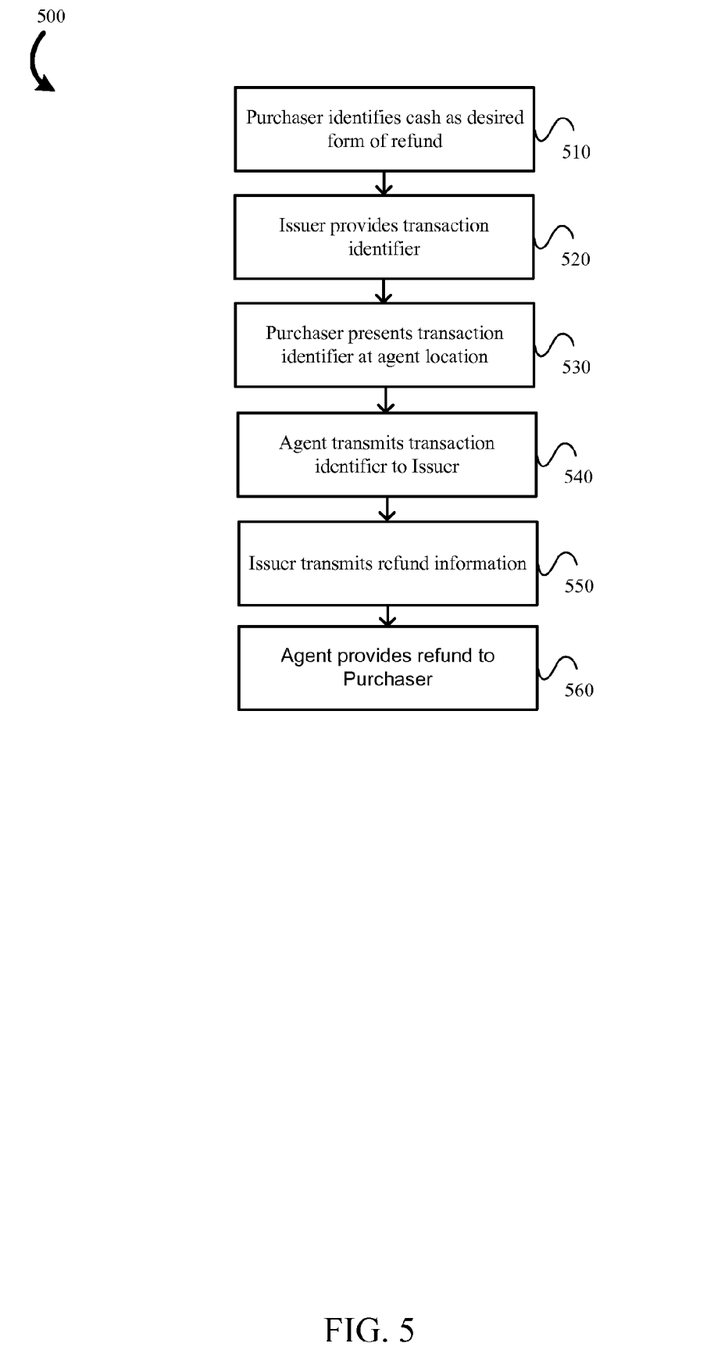
FIG. 5 illustrates an embodiment of a method for issuing a cash refund associated with a stored value card.

FIG. 5 illustrates a method 500 that may be executed if the purchaser desires a cash refund. In method 500, the purchaser first identifies 510 cash as the desired form of refund. This may occur during a step 450 of method 400 illustrated in FIG. 4 or some other method. The purchaser may indicate cash as the desired form of refund to the stored value card issuer via telephone, at an agent location, via the Internet, or any other suitable method. The purchaser may be required to produce some form of identifier to the issuer to prove that he is the purchaser of the stored value card. If the request is made at a location other than at an agent of the stored value card issuer, a transaction identifier may be provided 520 to the purchaser. Alternatively, the purchaser's name may serve as the transaction identifier or any other identifier capable of accurately identifying the purchaser. In some embodiments, a money transfer control number is used as the identifier. If the request for cash is made directly at an agent location, a transaction identifier may not be necessary. Depending on the stored value card, a cash refund may be issued directly by the issuer, such as at agent locations of the issuer, or at locations of an associated merchant. In some embodiments, the purchaser may have the option of receiving the refund from either the retailer or the issuer.

The purchaser may then present 530 the transaction identifier at an agent location. The agent may not be aware that the purchaser is receiving a refund for a stored value card as opposed to a money transfer. The agent may then transmit 540 the transaction identifier to the issuer. Based on this information, the issuer may then transmit refund information 550 to the agent. This refund information may include information such as: the amount of a refund the purchaser is entitled to, usage data of the stored value card, the date and time of each purchase, the final balance of funds on the stored value card, and coupons or deals for future stored value card purchases. Finally, the agent provides 560 the cash refund to the purchaser.

While the method 500 discusses the cash being received by the purchaser, the purchaser may designate another person as the recipient of the cash. For example, this may include the purchaser giving another person the transaction identifier. With the transaction identifier, the other person may be able to receive the refund at an agent location just as the purchaser could. Alternatively, it may involve informing the stored value card issuer that a designee will be receiving the cash instead of the purchaser. In some embodiments, a third party recipient of the refund is identified at the time the purchaser purchases the stored value card and sets the terms, limits, and conditions of the stored value card. The purchaser may designate a charitable foundation, church group, or fraternal organization as the recipient of any future refund that may be due.

As an example, the purchaser, an uncle, may purchase his nephew a $100 stored value card for the nephew's birthday. The uncle knows that his nephew tends to misplace or forget gifts shortly after receiving them. In order for the $100 not to be wasted, the uncle sets a parameter on the stored value card that if the $100 isn't used within 90 days, the remaining funds associated with the card will be donated to the Red Cross. The nephew may be unaware of this condition, or may only be aware of the expiration date. Further, the uncle may tell or provide his nephew all of this information, so that the nephew may be encouraged to not waste the money on an item he does not truly need, knowing that the money is not wasted and will be used for a good cause. If the expiration date is reached, the issuer may automatically mail a check to the Red Cross in the uncle's name, or may make an electronic payment to the Red Cross. The uncle may receive a notice of the amount of funds that was ultimately given to the Red Cross.

Figure 6:
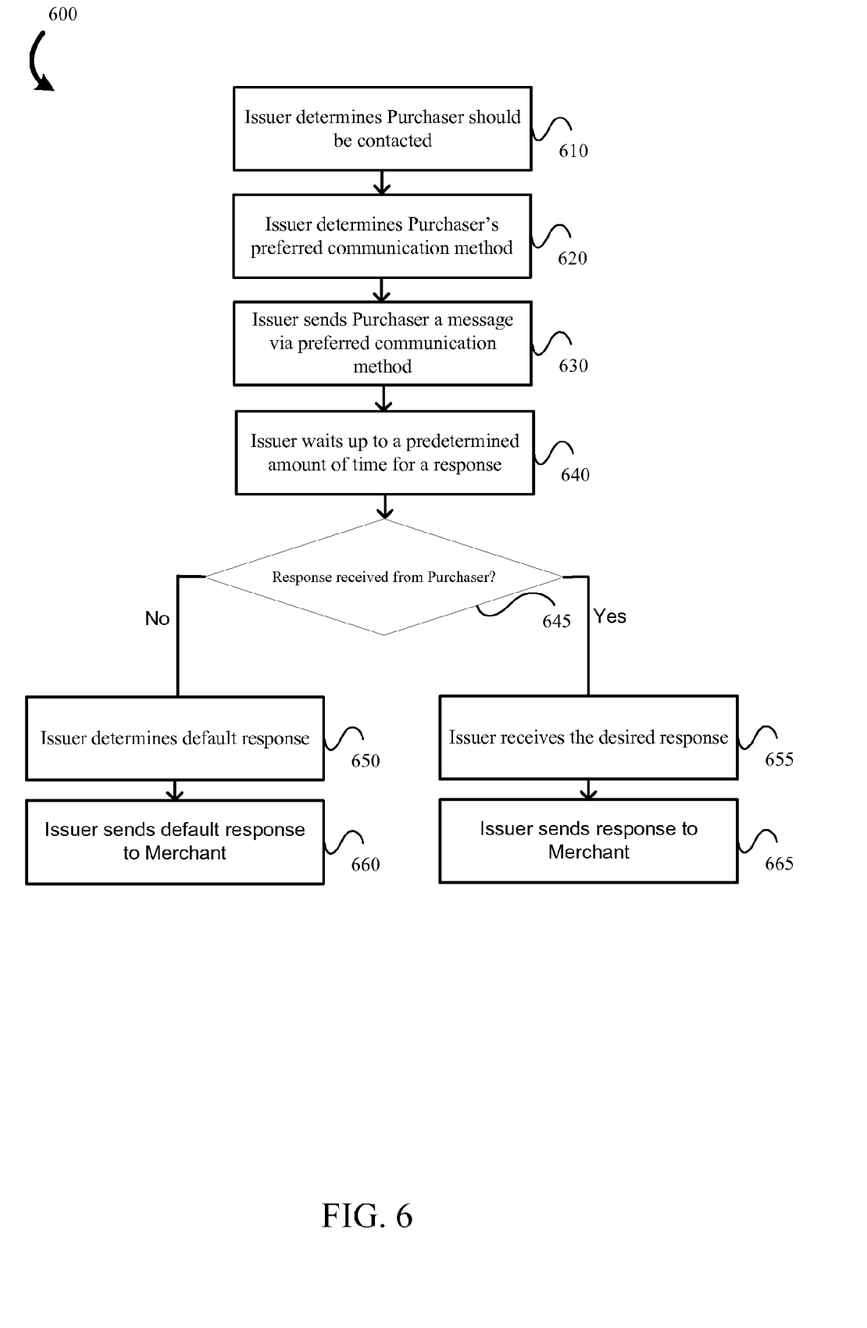
FIG. 6 illustrates an embodiment of a method for contacting the purchaser of a stored value card.

FIG. 6 details a method 600 previously mentioned in passing: an issuer receiving approval from a purchaser. Such a method may be used in method 300 of FIG. 3. For example, in steps 340 and 370, the issuer contacts the purchaser. The method 600 of FIG. 6 may be used in such a step, or may be part of some other method. Alternatively, the method 600 may stand alone as a separate process. First, the issuer may determine 610 if the purchaser should be contacted. This may happen following a transaction of a user, prior to approving a transaction of the user, when the funds associated with the stored value card reach a certain level, after a certain number of transactions, after a predefined time period, as a recurring message once every time period, whenever the user makes a cash withdrawal, whenever the user attempts to purchase goods or services that are part of a certain category of purchases, or when a refund is due. Those with skill in the art will recognize that the issuer contacting the purchaser may be desirable in many other circumstances also.

The issuer may need to determine 620 the purchaser's contact method. The contact method may be a default method selected by the issuer, or may be a method selected by the purchaser. Possible methods include email, text message, instant message, phone call, or mail. Obviously, if an immediate response is desired, certain methods will be distinctly faster than others. In some instances, the purchaser may receive a message via more than one method. Based on the determination 620, the issuer sends 630 a message via the preferred method or methods to the purchaser.

If the message is for information purposes only, the issuer may not wait for a response or any form of confirmation. However, if a response is necessary, based on the method of communication, such as for an approval of a transaction, the issuer may wait up to a predetermined amount of time for a response 640. Such a wait time may be beneficial to each party involved, considering the approval process: a wait time allows the purchaser a time to respond; however the transaction will not be unnecessarily detailed because a default response will be sent by the issuer if no response is received from the purchaser. From the point of view of the user, it may be impossible to determine if an approval or denial was made by the purchaser or was the result of a default selection by the issuer. Further, the user may not even be aware that the purchaser has been contacted.

If a response is received 655 from the purchaser regarding approval of a transaction, the response may be sent 665 to a merchant. If the message was regarding a refund due to the purchaser, the response may not be forwarded. In some embodiments, responses received from the purchaser may be forwarded to the user. Such forwarding may be useful when the purchaser has changed the rules or limits associated with the stored value card.

If a response was not received 645 from the purchaser in the predetermined amount of time, the issuer may determine 650 a default response. The default response may be set by the purchaser, or may be set by the issuer. Again, if the message was regarding the approval of a transaction, the default response may be sent 660 to a merchant. If the message was not time critical, the issuer may wait and resend the message after a period of time.

Figure 7:
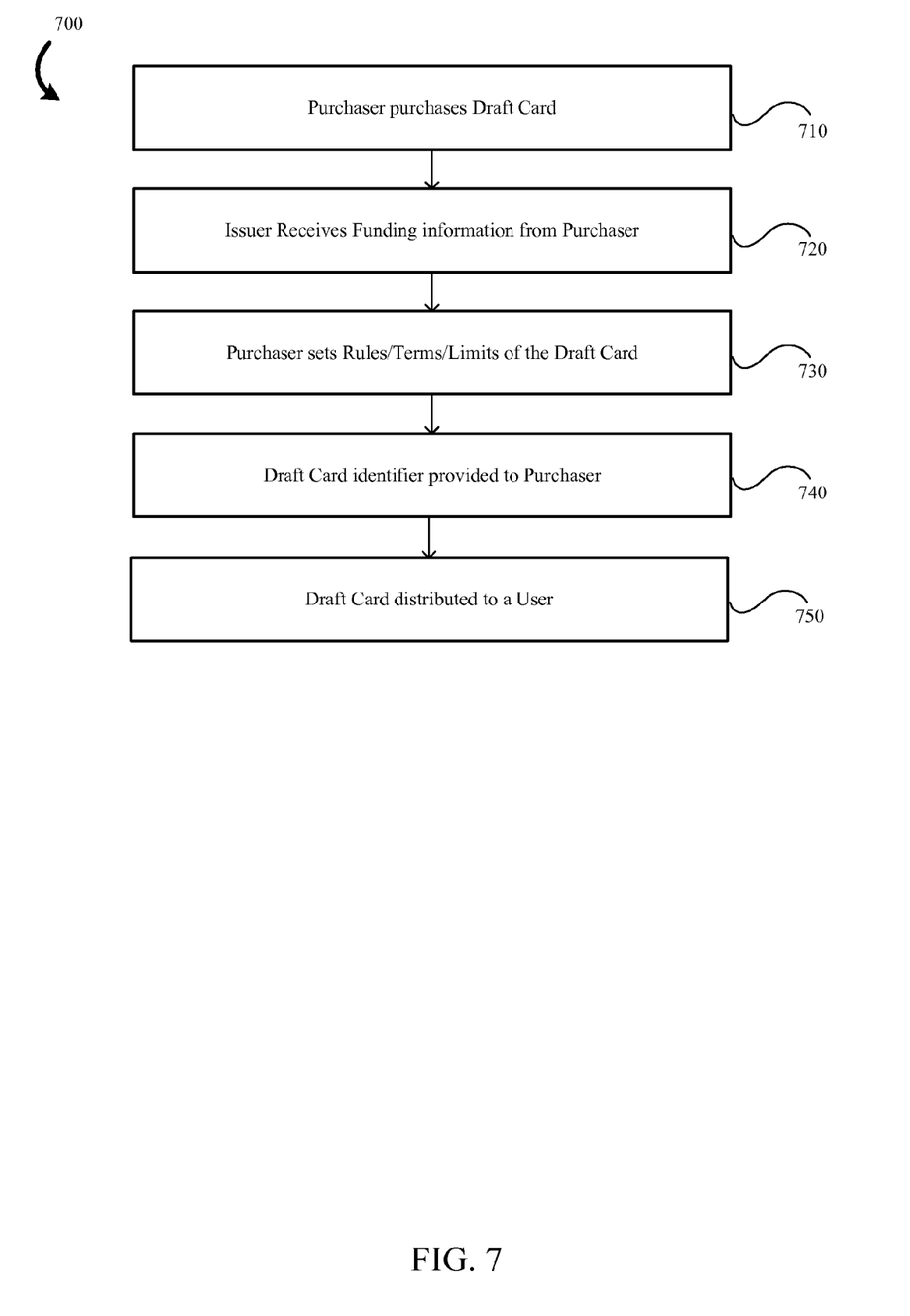
FIG. 7 illustrates an embodiment of a method of purchasing a debit card.
Figure 8:
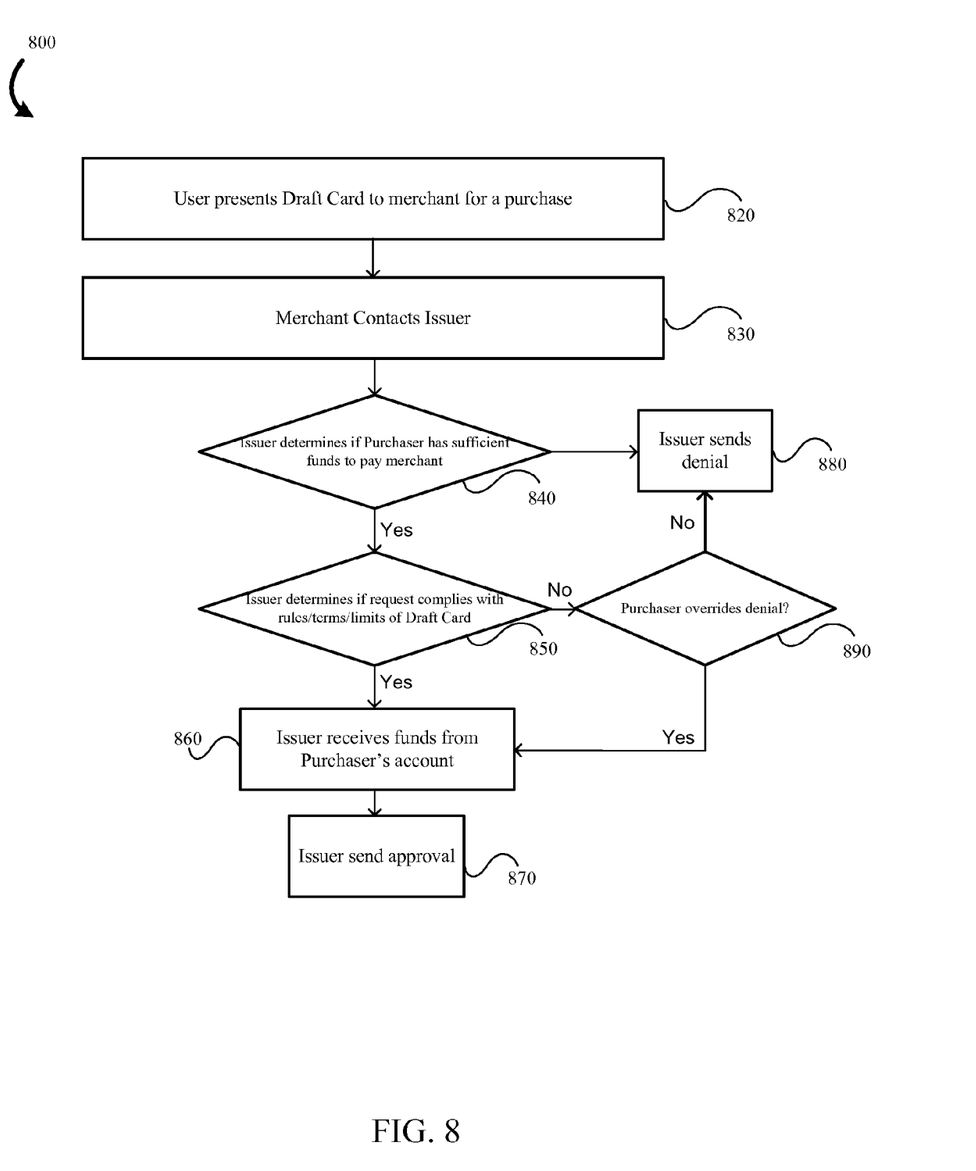
FIG. 8 illustrates an embodiment of a method of executing a transaction with a debit card.

The previous embodiments have discussed a situation where the purchaser deposits funds into a cash pool to be associated with a stored value card. However, in some embodiments, there may be no cash pool. Rather, a direct withdrawal from a funding source of the purchaser may be made each time a user is approved for a transaction. FIGS. 7 and 8 illustrate such methods. Method 700 and method 800 of a transaction may be implemented using the same or a similar system to system 100 of FIG. 1. Alternatively, this method may be implemented using a different system structure. To differentiate between stored value card and transaction cards of FIGS. 7 and 8, the cards will be referred to as "debit cards." It should be understood that besides a debit card drawing funds from a purchaser's funding source as opposed to a prepaid cash pool, the debit card may function similarly to a stored value card in the manners previously described.

The method 700 of FIG. 7 details the purchasing of a debit card by a purchaser. Here, a purchaser, alternatively referred to as a funder, purchases 710 a debit card. In some instances, such a debit card may be provided free of charge, or there may be a sign-up fee. The issuer may also receive 720 funding information. The funding information may include the purchaser providing information such as a bank account number, a routing number, a credit card number, and a billing address. The account the purchaser associates with the debit card may be held by the issuer or some other institution or bank. The account may be a credit account, checking account, brokerage account, or other designated consumer account.

The purchaser may then set 730 the parameters of the debit card. These rules may be similar to rules previously described regarding a stored value card. An identifier may be provided 740 to the purchaser. This identifier may be used to interact with the debit card or debit card account at a later time, such as changing the associated rules, terms, limits, or bank account. Next, the debit card may be distributed 750 to a user. In some instances, the purchaser may be the user. The debit card may be provided to the user by either the purchaser or the issuer. If the purchaser and the user are located in different countries, it may be convenient to have the user pick up the debit card at a local agent location.

Once the user has possession of the debit card or of an identifier number associated with the debit card he may be able to begin making transactions. FIG. 8 illustrates a method 800 of a user completing a transaction with a debit card. The user may present 820 a debit card for a purchase. If the transaction is in person, this may involve physically providing the debit card to a merchant or swiping the debit card at a point-of-sale. If the transaction is being performed remotely, such as via the Internet, a number or other identifier from the debit card may be used.

The merchant may then contact 830 the issuer for approval. Before proceeding the merchant may wait for a response message of approved or denied from the issuer. The issuer, upon receipt of this request, may determine 840 if the issuer has sufficient funds to pay the merchant for the amount of the request. The amount debited may be increased by a set amount or percent as a transaction fee due to the issuer. If there are sufficient funds in the account or other funding source specified by the purchaser, the issuer may then determine if the request complies with the parameters of the debit card set by the purchaser.

If the request complies 850 with the parameters set by the purchaser the issuer may debit the purchaser's account for the amount of the request and receive 860 the funds, plus a possible transaction fee. The debit of funds may be a form of electronic funds transfer (EFT) The debit may occur in the form of an automated clearing house debit. Once the issuer has received the request amount, the issuer may send 870 an approval to the merchant.

If the issuer determines 840 that the purchaser does not have sufficient funds to pay the merchant, the issuer may send the merchant a denial 880 for the requested transaction. Also, if the issuer determines 850 that a request does not comply with the parameters set by the purchaser, the purchaser may have the ability to override 890 the denial. Such an override may be executed in a similar manner to method 600 of FIG. 6. Depending on the outcome of the override, the request may still be denied with the issuer sending 880 a denial to the merchant. If the purchaser approves the override, the issuer may then receive 860 funds from the purchaser's account.

The issuer may then send an approval 870 to the merchant. A similar method may be executed for a cash request by the user.

The payment may be sent to the merchant through an automated clearing house (ACH) network. The ACH network operates to clear debits and credits electronically, rather than through the physical movement of checks. The ACH system uses batch processing, store and forward operations, and does not typically process payments individually. Originating depository financial institutions (ODFI) submit ACH payment files to the ACH operators. The ACH operators accumulate these files, sort them by destination, and transmit them to receiving depository financial institutions (RFDI) for application to customer accounts at predetermined times throughout the business day. The ACH system provides significant economies of scale compared to individual wire transfers, and is faster and more accurate than paper-check processing, and thus is an efficient electronic payment alternative to checks and wire transfers.

This description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention. For example, well-known circuits, processes, algorithms, structures, and techniques have been shown without unnecessary detail in order to avoid obscuring the embodiments.

Thus, various embodiments may omit, substitute, or add, various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the preceding systems, methods, and software may individually or collectively be components of a larger system, wherein other procedures may take precedence over or otherwise modify their application. Also, a number of steps may be required before, after, or concurrently with the following embodiments.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

What is claimed is:

1. A method for providing a refundable pre-paid transaction card, the method comprising:
receiving, by a computer system associated with an issuer, an indication of funds received from a purchaser;
linking, by the computer system associated with the issuer, an identifier of the transaction card with the funds, wherein:
the identifier is used by a user to conduct purchase transactions; and
the user and the purchaser are different persons;
receiving, by the computer system, one or more parameters that govern use of the identifier;
determining, by the computer system, at least one parameter of the one or more parameters has been satisfied; and providing, by the computer system, at least a partial refund to the purchaser of funds associated with the identifier that were not spent by the user.

2. The method for providing the refundable pre-paid transaction card of claim 1, further comprising:
after receiving the indication of funds received from the purchaser, receiving, by the computer system, a debit request from a merchant computer system, wherein the debit request is associated with the identifier;
determining, by the computer system, the debit request from the merchant complies with the one or more parameters for the identifier; and
transmitting, from the computer system to the merchant computer system, approval for the debit request.

3. The method for providing the refundable pre-paid transaction card of claim 2 further comprising transmitting, from the issuer, to the purchaser, a notification of the debit request.

4. The method for providing the refundable pre-paid transaction card of claim 3, wherein the one or more parameters that govern use of the identifier are received from the purchaser.

5. The method for providing the refundable pre-paid transaction card of claim 1, wherein the purchaser is not entitled to the at least partial refund until the at least one parameter of the one or more parameters has been satisfied.

6. The method for providing the refundable pre-paid transaction card of claim 1, further comprising:
in response to determining the at least one parameter of the one or more parameters has been satisfied, deactivating, by the computer system, the identifier such that the user cannot conduct purchase transactions using the identifier.

7. The method for providing the refundable pre-paid transaction card of claim 1, wherein determining at least one parameter of the one or more parameters has been satisfied comprises determining a velocity limitation has been met.

8. The method for providing the refundable pre-paid transaction card of claim 1, wherein:
a parameter of the one or more parameters indicates a refund date; and
determining the at least one of the one or more parameters has been satisfied comprises the refund date being reached.

9. The method for providing the refundable pre-paid transaction card of claim 1, wherein providing at least the partial refund to the purchaser of funds associated with the transaction card that were not spent by the user comprises:
providing at least the partial refund to the purchaser at an agent location of the issuer.

10. A computer program product residing on a non-transitory computer-readable medium for conducting a financial transaction involving a transaction card, the computer program product comprising computer-readable instructions configured to cause a computer system to:
receive an indication of funds received from a purchaser;
activate an identifier of the transaction card in response to the indication of funds received from the purchaser, wherein:
the identifier is used by a user to conduct purchase transactions; and
the user and the purchaser are different persons;
receive a parameter from the purchaser that governs use of the transaction card and the identifier;
determine the parameter has been satisfied; and
in response to determining the parameter has been satisfied, provide at least a partial refund to the purchaser of funds linked with the transaction card that were not used by the user.

11. The computer program product of claim 10, wherein the parameter specifies a date after which the purchaser is entitled to a refund.

12. The computer program product of claim 10, wherein the computer-readable instructions are further configured to cause the computer system to:
receive a debit request wherein:
the debit request indicates the identifier; and
the debit request is initiated in response to a purchase transaction being conducted by the user;
determine the debit request complies with the parameter for the identifier; and
provide approval for the debit request.

13. The computer program product of claim 12, wherein the computer-readable instructions are further configured to cause the computer system to:
cause a notification of the debit request to be transmitted to the purchaser.

14. The computer program product of claim 10, wherein the computer-readable instructions are further configured to cause the computer system to:
receive a debit request wherein the debit request indicates the identifier;
determine the debit request does not comply with the parameter for the identifier;
cause a notification of the debit request to be transmitted to the purchaser;
in response to the notification, receive purchaser approval for the debit request from the purchaser; and
in response to receiving the purchaser approval from the purchaser, provide approval for the debit request.

15. A system for conducting a financial transaction involving a transaction card, the system comprising:
a central computer server, comprising:
a processor; and
a memory, communicatively coupled with the processor, configured to store processor-readable instructions that, when executed, cause the processor to:
receive an indication of funds received from a purchaser at an agent location;
link an identifier with the funds and the transaction card, wherein:
the identifier is used by a user to conduct purchase transactions; and
the user and the purchaser are different persons;
store a parameter for the identifier that defines when the purchaser is entitled to a refund;
determine the parameter has been satisfied; and
provide at least a partial refund to the purchaser of funds linked with the identifier; and
the agent location, configured to:
receive funds from the purchaser;
provide the purchaser with the transaction card; and
receive a request for at least the partial refund from the purchaser.

16. The system for conducting the financial transaction involving the transaction card of claim 15, wherein the processor-readable instructions are further configured to cause the processor to:
receive a debit request from a merchant computer system, wherein the debit request is associated with the identifier;

determine the debit request from the merchant complies with at least one parameter for the identifier; and cause an approval for the debit request to be transmitted to the merchant computer system.

17. The system for conducting the financial transaction involving the transaction card of claim 16, wherein the processor-readable instructions are further configured to cause the processor to:

cause a notification of the debit request to be transmitted to the purchaser.

18. The system for conducting the financial transaction involving the transaction card of claim 15, wherein the parameter specifies a maximum number of purchase transactions that are permitted to be conducted using the identifier.

19. The system for conducting the financial transaction involving the transaction card of claim 15, wherein the parameter specifies a date after which the at least the partial refund is available to the purchaser.

20. The system for conducting the financial transaction involving the transaction card of claim 15, wherein the parameter specifies a maximum amount of funds available to the user per a time period.

* * * * *